W. EICHELBERGER & W. W. BREWER.
ICE CREAM CONE FILLER.
APPLICATION FILED NOV. 26, 1915.
1,199,880.
Patented Oct. 3, 1916.
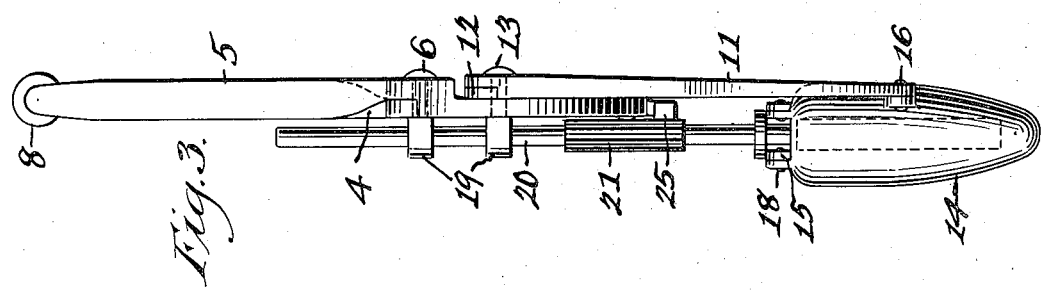
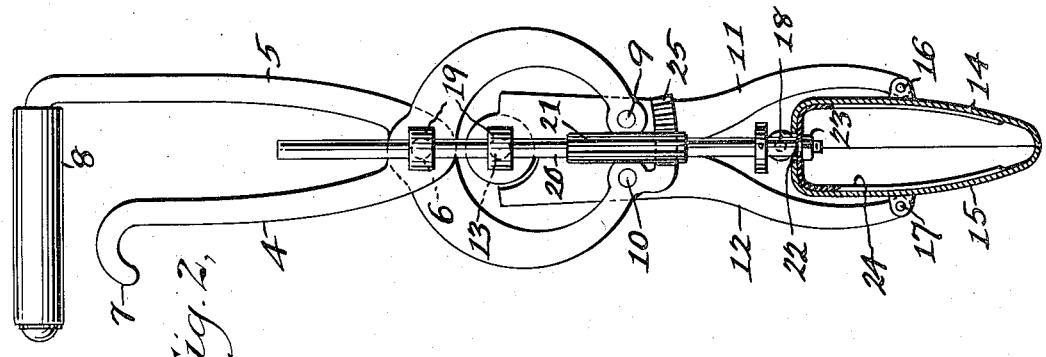
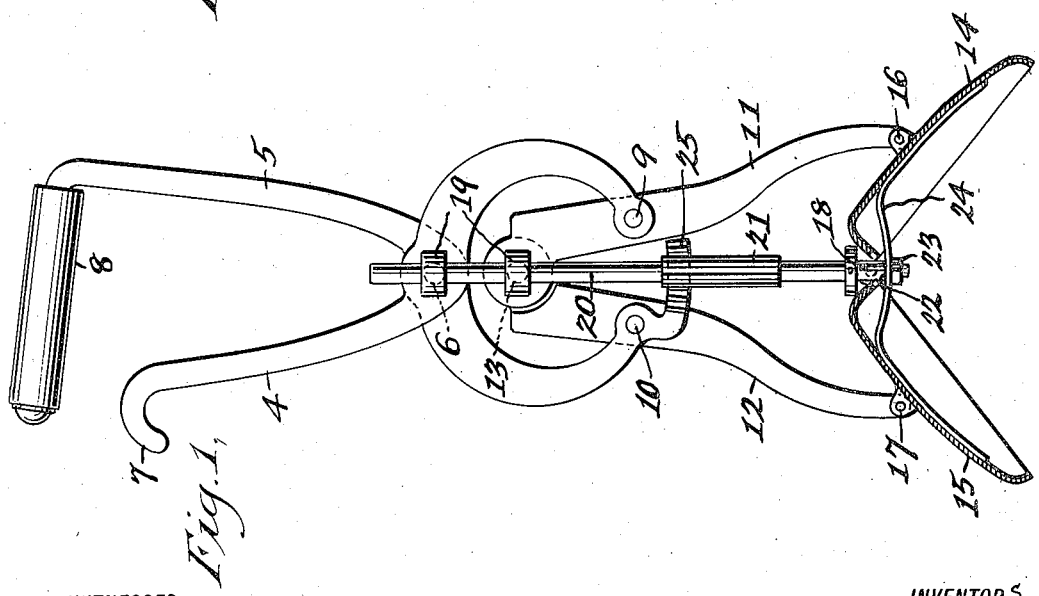
WITNESSES
Edw. Thorpe
J. E. Larsen
INVENTORS
W. Eichelberger
W. W. Brewer
BY
Munn & Co
ATTORNEYS

UNITED STATES PATENT OFFICE.

WILLIAM EICHELBERGER AND WALTER W. BREWER, OF PIERCE, WEST VIRGINIA.

ICE-CREAM-CONE FILLER.

1,199,880.  Specification of Letters Patent.  Patented Oct. 3, 1916.

Application filed November 26, 1915. Serial No. 63,488.

*To all whom it may concern:*

Be it known that we, WILLIAM EICHELBERGER and WALTER W. BREWER, citizens of the United States, and residents of Pierce, in the county of Tucker and State of West Virginia, have invented certain new and useful Improvements in Ice-Cream-Cone Fillers, of which the following is a specification.

Our invention relates to the vending of ice cream, particularly in cones, and the object thereof is to provide a device which will remove a predetermined quantity of ice cream from a can, mold the same into form to fit a cone, and deliver the same to the cone without the necessity for the hands of the operator being brought into contact with the ice cream.

Our invention is fully described in the following specification, of which the accompanying drawings form a part, in which like characters refer to like parts in each of the views, and in which:—

Figure 1 is a side view of the invention open, partly in section; Fig. 2 is a similar view thereof closed; and Fig. 3 is an edge view thereof closed.

In the drawings forming a part of this application we have shown tong-like levers 4 and 5 pivotally connected at 6, the former being provided with a hook 7 at its upper end and the latter with a handle 8.

The levers 4 and 5 are pivoted at 9 and 10 to two arms 11 and 12 in turn pivotally connected at 13 to each other and to two spoon shaped members 14 and 15 at 16 and 17, respectively, and which members are hinged together at 18, these members jointly forming the mold for the ice cream and having an interior configuration corresponding to the shape of a cone in which the ice cream is to be dispensed.

The pivots 6 and 13 carry guides 19 for a slidable rod 20 provided with a fluted or toothed portion 21 and extended between the spoon members 14 and 15, this end thereof being reduced in size to form a shoulder 22 and being screw-threaded at the reduced portion to receive a nut 23, and we may form a part of this reduced portion angular in cross section if desired. Carried on this reduced portion is a flat spring 24 the arms of which bear against the inner surfaces of the respective members 14 and 15 and tend to hold them in open position as shown in Fig. 1, and the above noted angular formation of the reduced portion of the rod 20, if provided, insures the spring 24 against any movement with respect to the rod, but this result may be accomplished by setting up the nut 23 tightly.

The lever 5 carries a rack bar 25 at its lower end enmeshed with the toothed portion 21 of the rod 20, whereby said rod will be rotated in the scissor-like movement of the levers 4 and 5 and the spring 24 revolved thereby.

In practice, the spoon members 14 and 15 are forced into the ice cream in open position, after which the upper ends of the levers 4 and 5 are brought together, one hand of the operator being sufficient for this operation, this moving the arms 11 and 12 together and closing the mold formed by the two spoon members to mold the ice cream therebetween. The device is then removed from the ice cream can and arranged over a cone, after which the manual tension on the levers 4 and 5 may be relieved to permit the spring 24 to force the spoon members apart, to deliver the molded portion of ice cream to the cone.

In both the closing and opening movements of the levers 4 and 5 the rod 20 has been rotated by the rack bar 25 and the spring 24 had thus been moved over the inner surface of the mold to scrape the ice cream therefrom and insure its delivery to the cone without knocking or other effort, this swinging movement of the spring being timed and being through only a part of a circle.

It will thus be seen that the operator has no occasion whatever to touch the ice cream, with the result that a sanitary condition obtains at all times, uniform quantities and uniform shapes of ice cream are delivered, and only one hand of the operator is required.

Having fully described our invention, what we claim as new, and desire to secure by Letters Patent, is:—

1. An ice cream cone filler, comprising a mold formed of a plurality of hinged spoon members, a spring within said mold for holding said members in open positions, means for manually closing said mold, and means for revolving said spring to scrape the inner surfaces of said members.

2. An ice cream cone filler, comprising a mold formed of a plurality of hinged spoon members, arms pivoted thereto and to each other, levers pivoted to said arms and to each other, a spring for holding said members in open positions, and means actuated by said levers for revolving said spring to scrape the interior surfaces of said members.

In testimony whereof we have signed our names to this specification in the presence of two subscribing witnesses.

WILLIAM EICHELBERGER.
WALTER W. BREWER.

Witnesses:
F. S. ADAMS,
D. J. HOVATTER.